United States Patent [19]

Hoffman

[11] Patent Number: 4,984,669
[45] Date of Patent: Jan. 15, 1991

[54] DRUM ASSEMBLY FOR A CENTRIFUGAL CLUTCH

[75] Inventor: Ronald J. Hoffman, Phoenix, Ariz.

[73] Assignee: Inertia Dynamics Corporation, Chandler, Ariz.

[21] Appl. No.: 433,706

[22] Filed: Nov. 13, 1989

[51] Int. Cl.$^5$ .......................... F16D 13/62; F16D 4/00
[52] U.S. Cl. ................................ 192/110 R; 29/525;
192/105 R; 403/359; 403/365
[58] Field of Search ........ 192/110 R, 105 R, 105 BA,
192/105 BB, 105 CD, 105CE; 403/365, 359,
282; 29/525

[56] References Cited

U.S. PATENT DOCUMENTS

| | | | |
|---|---|---|---|
| 3,074,292 | 1/1963 | Polman | 29/525 X |
| 3,078,754 | 2/1963 | DeLacy | 29/525 X |
| 4,226,454 | 10/1980 | Tranberg et al. | 403/359 X |
| 4,295,753 | 10/1981 | Luerken et al. | 403/365 |
| 4,714,371 | 12/1987 | Cuse | 403/365 X |

Primary Examiner—Rodney H. Bonck
Attorney, Agent, or Firm—Brooks & Kushman

[57] ABSTRACT

A drum assembly for a centrifugal clutch which is rotatable about an axis of rotation is disclosed. The drum assembly has a generally cylindrical drum having an open end with a peripheral interior circular track extending concentrically around the axis. The circular track is to be engaged by throw weights of a driver when the driver reaches sufficient rotary velocity. The opposite end of the cylindrical drum has a central neck defining a passage therethrough into which an output shaft is fitted. The output shaft is brazed to and extends axially away from the neck and has a central, axially extending recess in its end away from the drum. A plurality of identical washers formed as a stack are embedded into the recess each having a central noncircular opening and a circular rim having a progression of sharp tooth-like serrations. The washers are composed of material harder than the material of the output shaft so that the serrations can be embedded in the recess. The openings have high resistance to wearing forces from a user device removably coupled to the washers.

5 Claims, 1 Drawing Sheet

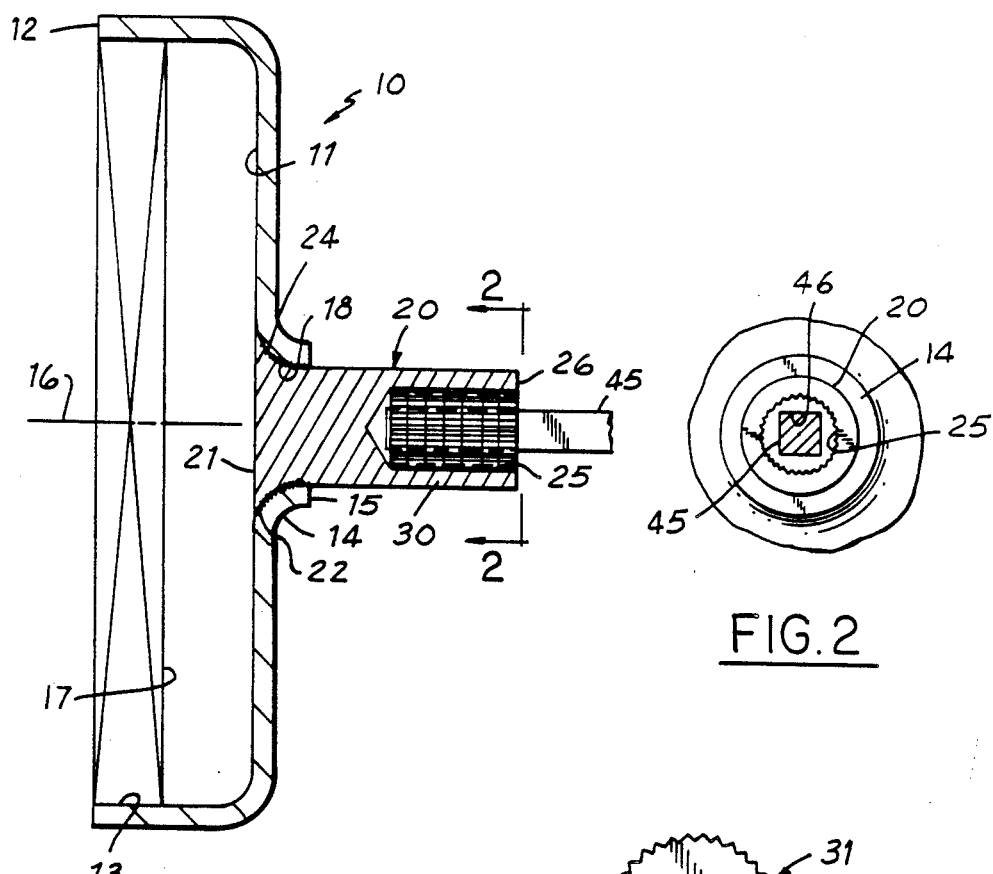
FIG. 1
FIG. 2
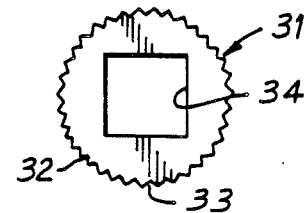
FIG. 3
FIG. 4
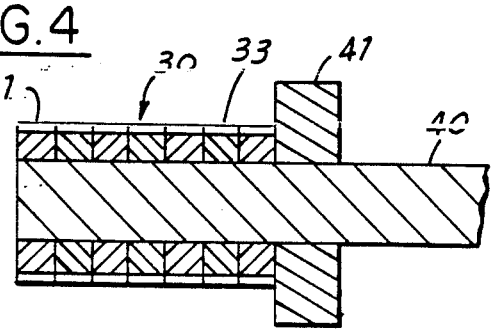

DRUM ASSEMBLY FOR A CENTRIFUGAL CLUTCH

FIELD OF THE INVENTION

This invention relates to centrifugal clutches, and in particular to a drum assembly which connects to a next assembly such as a drive shaft or a drive cable.

BACKGROUND OF THE INVENTION

Centrifugal clutches are widely used to transmit torque from an engine to a user device. Generally these are used for devices having small, or at the most moderate, horsepower ratings. Their use in small vehicles such as scooters and golf carts are well known. The clutch art is well-developed for such devices. The transmissions are generally sizable, and weight and bulk are of little concern, and in these fields some increases in cost of components are tolerable.

In recent years the use of fractional horsepower 2 cycle internal combustion engines has become commonplace. Their small engines drive relatively small devices. Brush cutters and flexible string trimmers are well-known examples. These are hand-carried appliances. A lighter-weight device which will accomplish the same results as a heavier device is likelier to sell.

Furthermore, the sales price of these devices is surprisingly low, and the market is very competitive as to price. It follows that any component of the device which can perform the same function as a more expensive component, can result in important cost advantages. It should be remembered that the sales price of the appliance is the resultant of many factors, of which the manufacturing cost is an important one. Any increase in cost at that level is magnified at least several times in the retail price of the device, because that is how commercial pricing is done. Conversely, the saving of even a few cents at the manufacturing level can give the sales department an important edge, and in head-on price competition, can generate substantial profits.

Cost and pricing considerations aside, there still remains the objective of producing a reliable and long-lived appliance. It does no good to reduce manufacturing costs merely to lose the advantage by way of increased warranty repair work.

A centrifugal clutch has a driver portion and a driven portion. The driver portion is connected directly or through some transmission means such as a solid shaft or a flexible cable, to an engine. It includes throw weights which at a sufficient rotational velocity, move radially outward to engage the driven portion and drive it.

The driven portion includes a circular drum assembly which the throw weights engage. This driven portion has an output shaft to which power transmission means is coupled. The output shaft is journaled to a housing by a bearing. The coupling is generally made to a rather small-sectioned power transmission element such as a square-shaped end fitting on a flexible cable drive or a square shaped end on a solid shaft.

The rotational velocities of these drives is surprisingly large, and there are considerable peak-load torque forces. True concentricity of the drum and the output shaft is necessary, and so is a very strong, wear-resisting coupling between the output shaft and the driven device such as the input shaft of a brush cutter blade.

These requirements, and the desirability of a lower cost item, are in known devices at cross-purposes with one another. The concentricity of the drum and the output shaft may readily be lost by heat treating an assembled structure that is heat-treated in order to provide sufficient strength and surface hardness. Also, in order to provide sufficient bearing strength for the joinder in the output shaft, a relatively expensive heat-treatable alloy must be used. As a consequence, to make the drum assembly of drum and output shaft, great care must be taken in assembly and heat treating, and relatively costly materials must be used for both.

It is an object of this invention to provide a drum assembly for a centrifugal clutch whose parts can be assembled by expedient brazing operations, and which can be made mostly of relatively inexpensive materials Which do not require heat treatment, and to provide an exceptionally inexpensive part where hardness is needed.

BRIEF DESCRIPTION OF THE INVENTION

A clutch drum assembly according to this invention has a drum with an open end and an internal peripheral track engageable by the throw weights of a conventional centrifugal clutch. The drum and track have a common center of rotation. An output shaft is brazed to the drum and extends axially away from it.

A recess is formed in the free end of the output shaft. A plurality of flat hard washers each has an identical non-circular port through and an identical progression of edge serrations around its rim. The ports and serrations are aligned with one another. The washers are pressed as an aligned group into the recess The serrations dig into the wall of the recess and restrain themselves against rotation relative to it. Because these washers are made Very hard and are aligned, there is provided a strong receptacle to receive a next assembly such as a square shape. Because the washers are inserted as a group they can be accurately aligned, and concentricity can be assured.

The manufacture of this article then becomes merely one of brazing a shaft to a drum at temperatures which do not tend to warp the drum, and then after cooling to press the stack of washers into the output shaft. The washers are readily manufactured by an inexpensive, rapid stamping process, using flat sheet materials already heat treated or otherwise processed to sufficient strength and hardness. Less expensive materials and processes are used, and manufacturing cost is reduced.

The above and other features of this invention will be fully understood from the detailed description and the accompanying drawings, in which:

BRIEF DESCRIPTION OF THE INVENTION

FIG. 1 is a cross-section of the presently preferred embodiment of invention:

FIG. 2 a fragmentary right hand view taken at line 2-2 in FIG. 1;

FIG. 3 is a plan view of a washer used in this invention; and

FIG. 4 is an axial cross-section showing a stack of washers on an assembly tool awaiting installation.

DETAILED DESCRIPTION OF THE INVENTION

A clutch drum assembly 10 according to this invention is shown in FIG. 1. It includes a generally cylindrical drum 11 having an open end 12, a peripheral interior track 13, a short neck 14, and a passage 15 through the neck.

The track extends concentrically around a central axis 16, which is the axis of rotation of the device. A schematically-shown driver 17, such as a rotor with centrifugal fly-weights is disposed in the drum assembly so that its weights will extend and engage track when motive means turns it sufficiently fast. This is not part of the invention, and will not be described in detail. Suffice it to say that radial extension of the fly-weights is resisted by a garter spring. Preferably the passage has a tapered wall 18. An output shaft 20 is fitted in passage 15. The output shaft may have a small head 21 and a tapered under surface 22 which snugly fits in tapered wall 18 of the passage. The criss-cross notation 24 indicates a brazed joinder fixing the output shaft to the drum.

The output shaft may be made of an inexpensive low-carbon steel structure such as 1020 or 1040. Heat treatment is not necessary.

An initially circular recess 25 is drilled into the free end 26 of the output shaft. A stack 30 of identical washers 31 is pressed into the recess. These are hard washers stamped from material which inherently has the strength to resist the distortive forces of a driven element that is fitted into them.

The washers are identical. They have a circular rim 32 modified by a progression of sharp tooth-like serrations 33. A central opening 34 is non-circular. Usually it will be square. The crests of the serrations are on a circle with a diameter somewhat greater than the initial diameter of the recess. When forced into the recess they will cut their way into the wall of the recess, displacing some of the material into a portion of the serrations inside the initial diameter of the recess, and embedding themselves into the wall of the recess.

Because the washers are identical, when they are spindled in a stack on a square assembly tool 40 (FIG. 4), their serrations will line up, and the outside of the assembly resembles a splined insert. For convenience, a magnet 41 may be included in the assembly tool to hold the loose stack together as a unit for convenience in assembly.

For this assembly, the tool presses the stack of washers into the recess, and is then withdrawn. The washers will remain in place in alignment to form a square socket. A square input shaft 45 for a user device such as a brush cutter, is shown in the square recess 46 formed by the installed washers.

The washers can be made rapidly and inexpensively by stamping machinery, and are a minor cost compared to the cost of machined output shafts. Should there be any minor misalignment of one or more of the installed washers, it is likely to partially fail a small region of wall contiguous to it, but this failure will not go far. Instead, when it catches up with the remainder of the stack it will add its strength to the group.

This invention thereby provides a clutch drum assembly which can be made expediently by a simple assembly process, and of materials of lesser cost that are normally required, With no need for heat treatment of the assembled device.

This invention is not to be limited by the embodiment shown in the drawings and described in the description, which is given by way of example and not of limitation but only in accordance with the scope of the appended claims.

I claim:

1. A clutch drum assembly for a centrifugal clutch, said drum assembly having an axis of rotation, and comprising:
   a generally cylindrical drum having an open end, a peripheral interior circular track, a central neck, and a passage through the neck said track extending concentrically around said axis, and adapted to be engaged by throw weights of a driver when the driver is rotated at a sufficient rotary velocity:
   an output shaft fitted in said passage through said neck and brazed to said drum at said neck, said output shaft having a central, axially extending recess in its end away from said drum: and
   a plurality of identical washers formed as a stack and inserted in said recess in interference and material-displacement relationship with the wall of the recess, each said washer having a central non-circular opening and a circular rim having a progression of sharp tooth-like serrations, the material of said washer being harder than the material of the output shaft, whereby said serrations can be embedded in said recess, and whereby the resistance of the washers at their openings to wearing forces from a user device coupled to said washers is greater than would be the resistance of a similar opening in the material of the output shaft.

2. A drum assembly according to claim 1 in which said openings in said washers are square, and in the stack are aligned to form a square socket to receive a square coupler.

3. A drum assembly according to claim 1 in which said washers are stampings made of material heat treated to specification before the stamping operation.

4. A drum assembly according to claim 1 in which said recess is initially circular.

5. In a method of assembling the drum assembly of claim 1, the steps comprising spindling a stack of said washers on a mandrel having a shape corresponding to the shape of said openings, and, with the mandrel still in place, forcing said washers as a stack into said recess.

* * * * *